Sept. 7, 1965           E. L. WEIMER           3,204,366
ANIMAL TRAP
Filed Oct. 23, 1963
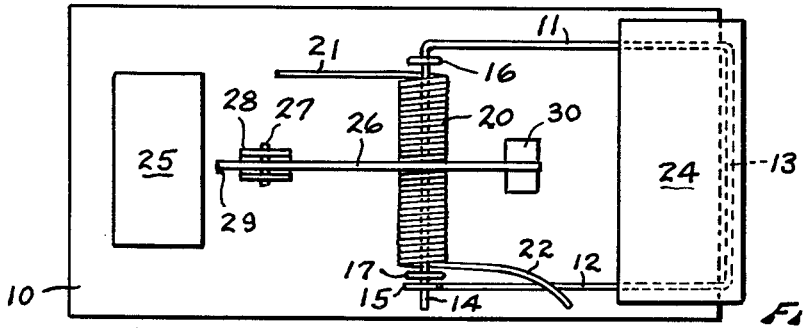
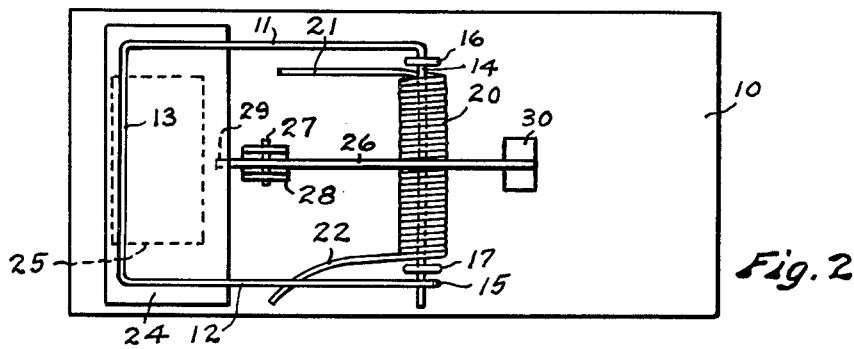
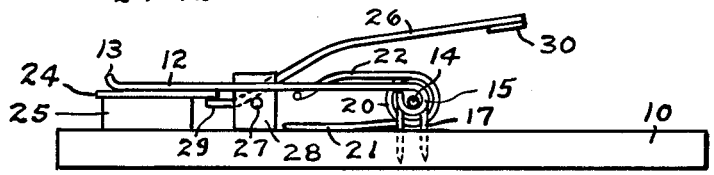
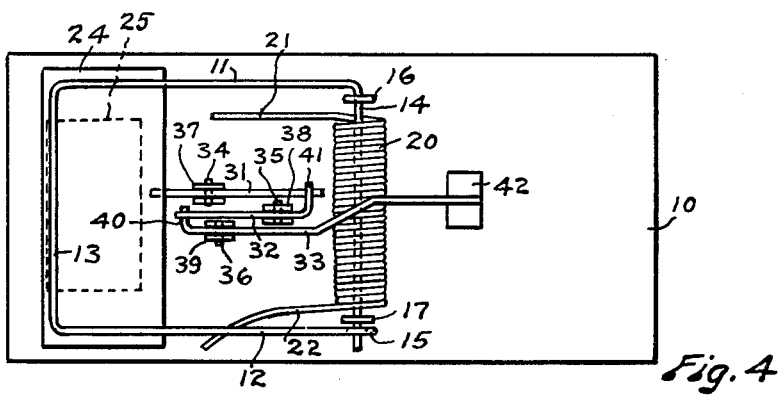
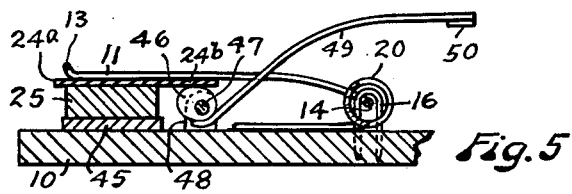
INVENTOR.
Emory L. Weimer
BY Fred C. Matheny
ATTORNEY

United States Patent Office 3,204,366
Patented Sept. 7, 1965

3,204,366
ANIMAL TRAP
Emory L. Weimer, Orondo, Wash.
Filed Oct. 23, 1963, Ser. No. 318,379
2 Claims. (Cl. 43—83.5)

My invention relates to an animal trap of well known type in which a spring actuated trap member used to catch rodents and like animals is held in a set position by trip mechanism.

By way of illustration I have shown by invention as embodied in a well known type of rodent trap in which the operating parts of the trap are assembled on a plane flat base which is adapted, when set for operation, to rest flatly on the ground or floor but it will be understood that the invention may be embodied in other types of traps.

The setting of an ordinary mouse trap of the general type herein disclosed is a task which many persons do not like to perform because it involves first retracting the spring actuated trap member and then while the spring actuated trap member is held, usually with one hand, in a retracted position, properly adjusting or setting the trip mechanism with the other hand to hold said spring actuated trap member retracted or set. While the trip mechanism is being adjusted or moved to the set position the hand used in setting it must be disposed in an area through which the spring actuated trap member will move if it is accidentally released and this makes possible injury to the hand. Also if the spring actuated trap member is accidentally released or tripped and snaps to its holding or sprung position without contacting the hand it makes a noise which is startling and unpleasant to the person handling the trap.

An object of my invention is to provide a trap which does not require the setting or manual engaging of any trip mechanism to hold the spring actuated trap member in a retracted or set position and in which the only operation required in setting the trap is the operation of moving the spring actuated trap member to its fully retracted position.

Another object is to provide a trap of this type in which the spring actuated trap member is held in a retracted or set position by a permanent magnet which exerts a little more than enough force to overcome the opposing force exerted by the spring tending to move said trap member from the set to the holding or sprung position, and in which said trap member, when in a set position, is always engaged by trip mechanism which will release it from the magnet in the event even a light force is applied to said trip mechanism by an animal attempting to obtain bait connected with said trip mechanism.

Other objects of my invention will be apparent from the following description taken in connection with the accompanying drawings.

In the drawings FIGURE 1 is a plan view of my trap showing a spring actuated trap member in a position it will occupy when the trap is sprung, this position being herein termed a holding position.

FIG. 2 is a similar plan view showing the said spring actuated trap member in a retracted or set position.

FIG. 3 is an edge view, showing the parts in the set position in which they appear in FIG. 2.

FIG. 4 is a plan view of my trap, showing trip mechanism of modified form and showing the parts of the trap in set position.

FIG. 5 is a fragmentary sectional view of my trap, with parts in elevation, showing another modified type of trip mechanism and showing the trap in set position.

Like reference numerals refer to like parts throughout the several views.

FIGS. 1, 2 and 3 show a trap comprising a flat rectangular base 10 having a spring actuated trap member mounted thereon. Said spring actuated trap member comprises a piece of wire bent into a substantially rectangular shape and composed of two side members 11 and 12, an outer end member 13 and an inner end member 14. The terminal portion of the inner end member 14 extends through an eye member 15 formed by bending the inner end portion of the side member 12. The inner end member 14 extends crosswise of the base 10 about midway between the two ends of said base and is pivotally connected with said base by suitable means, such as two staples 16 and 17 which are driven into said base. The staples 16 and 17 are respectively positioned adjacent the side wires 11 and 12 and pivotally mount the trap member on the base 10 for movement between a holding position, shown in FIG. 1, and a set position, shown in FIGS. 2 and 3. A helical spring is supported on and by the inner end member 14. One outwardly extending end portion 21 of the spring member 20 rests on the base 10 and the other outwardly extending end portion 22 of said spring is in engaged relation with the side bar 12, the arrangement being such that the spring 20 resiliently urges the trap member toward the holding position in which it is shown in FIG. 1. All of the previously described parts are of well known and conventional construction.

In accordance with my invention I provide on the spring actuated trap member composed of parts 11, 12, 13 and 14, an armature 24 of magnetic material and provide on the base 10 a permanent magnet 25. Obviously the armature 24 and magnet 25 herein disclosed would operate in substantially the same manner in holding the spring operated trap member retracted or in set position if the armature were attached to the base 10 and the magnet to the spring actuated trap member. However, the magnet 25 is ordinarily heavier than the armature 24 and I prefer to attach the lighter part to the trap member. Also it will be understood that the armature 24 can be replaced by a permanent magnet of opposite polarity from the magnet 25.

The magnet 25 and armature 24 are positioned so they will be in face to face contact when the trap member is in set position. The magnet 25 is strong enough to hold said trap member in the set position shown in FIGS. 2 and 3 until a slight force in addition to that of the spring 20 is applied in a direction tending to separate the armature 24 from the magnet 25, whereupon the spring 20 will speedily swingingly move the trap member into the holding position in which it is shown in FIG. 1.

The trip means shown in FIGS. 1, 2 and 3 comprises a trip lever 26 pivotally mounted by a rigidly attached pivot member 27 in a U-shaped bracket 28. The pivot member 27 can be soldered or welded crosswise of the trip lever 26 and the bracket 28 is rigidly attached to the base 10. The trip lever 26 is shaped and positioned so that an end 29 thereon close to pivot member 27 is always engaged underneath the adjacent edge portion of the armature 24 when said armature is in engagement with the magnet 25 and the trap is upright. The outer end portion of the trip arm, shown at the right in FIGS. 1, 2 and 3, is suitably shaped, or is provided with holding means such as a plate 30, to which bait can be attached. Obviously this end of lever or trip arm 26 can be pointed and barbed so that bait pushed onto it will resist being pulled off.

In the modified form of my invention shown in FIG. 4 the parts numbered 10 to 17 and 20, 21, 22, 24 and 25 are duplicates of the similarly numbered parts shown in FIGS. 1, 2 and 3 but the trip mechanism is of modified form to provide greater leverage than the trip lever 26 does. Said trip mechanism comprises three levers 31, 32 and 33 pivotally mounted respectively on the base 10 by three pivots 34, 35 and 36, supported for oscillaiton by three brackets 37, 38 and 39 respectively, said brackets being rigid with the base 10. The lever arm 33 has a transversely bent end portion 40 which extends under the lever arm 32 so that it can exert a lift on lever arm 32. Said lever arm 32 has a transversely bent end portion 41 which extends over the lever arm 31 so that it can exert a downward pressure on said lever 31. The lever 33 is the main trip lever and it extends outwardly and upwardly across the spring 20 and has a bait attachment member 42 rigid with its outer end portion. The levers 31, 32 and 33 provide compound leverage whereby the exertion of a slight downward pull on the bait attachment member 42 will exert enough lift on the armature 24 to cause it to break away from the magnet 25 and permit action of the spring 20.

In the modified form of the invention shown in FIG. 5 the parts 10, 11, 13, 14, 16, 20, 21 and 25 are duplicates of the similarly numbered parts shown in FIGS. 1, 2 and 3 but the trip mechanism is of a different form. In said FIG. 5 the magnet 25 is elevated as respects the base member 10 by placing a spacer block 45 between said magnet and base member. Also an armature 24a of greater width than the armature 24 is secured to the spring actuated trap member. Said armature 24a has an overhanging part 24b of substantial width and a cam 46 is positioned beneath part 24b and supported for rotative movement by a pivot member 47 and bracket 48. A trip lever 49 is rigidly attached to the cam 46 and extends outwardly and upwardly therefrom and has a bait attachment member 50 secured to its outer end. Obviously a slight downward pull exerted on any bait which is connected with the member 50 will, if the parts are in the set position shown in FIG. 5, rotatively move the cam 46 and exert enough lift on armature part 24b to free the armature from the magnet 25 and allow the spring 20 to snap the spring actuated trap member toward its holding position.

Each trip mechanism herein disclosed operates by exerting a lift on an armature attached to the trap member. This lift, added to the force exerted on the trap member by the spring 20, overcomes the force of the magnet sufficiently to release the trap member. Obviously this lift could be applied directly to a part of the trap member.

The foregoing description and accompanying drawings clearly disclose preferred embodiments of my invention but it will be understood that this disclosure is merely illustrative and that changes in the invention may be made within the scope of the following claims.

I claim:

1. An animal trap comprising a plane flat rectangular base; a trap member of bent wire construction and generally rectangular shape; means pivotally mounting one end portion of said trap member on said base approximately midway between the two ends of said base providing for substantially one hundred eighty degrees swinging movement of said trap member between a set position and a holding position; a helically wound torsion spring on the pivotally mounted end portion of said trap member urging said trap member into the holding position; a relatively large flat armature plate of magnetic material rigid with and extending across the end portion of said trap member remote from said pivot means; a permanent magnet rigid with an end portion of said base and positioned to be engaged by said armature plate when said trap member is in a set position, the holding force exerted by said magnet on said armature plate when the armature plate is in engagement with the magnet being at least enough greater than the opposing force exerted on said trap member by said spring to hold the trap member in set position; and a trip lever pivotally mounted on said base adjacent to said magnet and extending lengthwise of said base over and across said spring and the pivotally mounted end portion of said trap member, the end portion of said trip member remote from said magnet being adapted to have bait attached thereto; and means connected with the pivoted end of said trip lever adapted to exert on said armature and said trap member a force tending to separate said armature from said magnet and release said trap member for movement thereof by said spring from a set position toward a holding position.

2. The apparatus as claimed in claim 1 in which the armature plate has a part overhanging the edge of the magnet, said means connected with the pivoted end of said trip lever being a cam member which is positioned beneath and engages said overhanging part of said armature plate.

References Cited by the Examiner

UNITED STATES PATENTS

| | | | |
|---|---|---|---|
| 298,361 | 5/84 | Erling | 43—61 |
| 1,515,590 | 11/24 | Calbeck | 43—70 |
| 2,735,216 | 2/56 | Stebbins | 43—83.5 |

ABRAHAM G. STONE, *Primary Examiner.*

SAMUEL KOREN, *Examiner.*